United States Patent [19]

McGhee

[11] Patent Number: 5,505,080
[45] Date of Patent: Apr. 9, 1996

[54] TIRE PRESSURE MANAGEMENT SYSTEM

[75] Inventor: C. Lester McGhee, Arlington, Tex.

[73] Assignee: TellAir Corporation, Seabrook, Tex.

[21] Appl. No.: 241,581

[22] Filed: May 12, 1994

[51] Int. Cl.$^6$ .................................................. B60C 23/00
[52] U.S. Cl. ........................ 73/146.5; 340/447; 116/34 R;
200/61.22; 152/419
[58] Field of Search ...................................... 152/415, 416,
152/417, 418, 419; 116/34 A, 34 B, 34 R;
141/38, 41; 417/231; 301/37.25; 180/65.6,
165; 310/74, 80, 152, 153; 73/146.4, 146.5,
146.8; 340/447; 200/61.22

[56] References Cited

U.S. PATENT DOCUMENTS

| | | | |
|---|---|---|---|
| 3,717,030 | 2/1973 | McGhee et al. | 73/146.3 |
| 4,074,227 | 2/1978 | Kalmus | 340/58 |
| 4,090,172 | 5/1978 | Vesnic | 340/58 |
| 4,333,609 | 6/1982 | Backo | 239/124 |
| 4,389,166 | 6/1983 | Harvey et al. | 417/234 |
| 4,441,539 | 4/1984 | Hulse | 152/417 |
| 4,715,787 | 12/1987 | Hung | 417/63 |
| 4,742,857 | 5/1988 | Gandhi | 152/418 |
| 4,840,212 | 6/1989 | Wei | 152/419 |
| 4,978,941 | 12/1990 | Brown | 340/447 |
| 5,180,283 | 1/1993 | Vickery, III | 417/234 |
| 5,318,317 | 6/1994 | Hopper | 280/201 |
| 5,325,902 | 7/1994 | Loewe et al. | 152/419 |
| 5,335,540 | 8/1994 | Bowler et al. | 73/146.5 |

Primary Examiner—Hezron E. Williams
Assistant Examiner—Richard A. Moller
Attorney, Agent, or Firm—Harrison & Egbert

[57] ABSTRACT

A tire pressure management system including a tire condition monitor connected to the tire so as to be interactive with air pressure in the tire and for selectively measuring a pressure in the tire, a controller, and a display. The tire condition monitor includes a transmitter and a receiver. The controller also has a transmitter and a receiver connected thereto. The transmitter of the controller serves to transmit a first radio signal to the receiver of the tire condition monitor. The receiver of the controller serves to receive a second radio signal from the transmitter of the tire condition monitor. The display is connected to the controller so as to display a humanly perceivable indication of a condition of the tire. An air compressor is mounted to a wheel of the tire so as to deliver air to an interior of the tire when the pressure of the tire is below a predetermined value. A power generator is connected to the wheel of the tire and includes an alternator magnet assembly and an induction coil assembly which are connected to the wheel of the tire such that relative rotation occurs therebetween as the tire rotates.

1 Claim, 7 Drawing Sheets

TIRE PRESSURE MANAGEMENT SYSTEM

TECHNICAL FIELD

The present invention relates to devices for monitoring air pressure in a vehicle tire. More particularly, the present invention relates to systems for the remote monitoring of a vehicle tire condition as the tire of the vehicle travels along a road surface. Furthermore, the present inventions relates to devices for automatically maintaining the tire pressure of a tire as the vehicle tire travels along a surface.

BACKGROUND ART

When any type of vehicle is operated at highway speeds, it is desirable to be aware of loss of pressure in one or more of the vehicle tires, particularly from the standpoint of safety. It is known that vehicles become increasingly hard to control as one or more of the tires become soft and, particularly in emergency situations, such reduced control may result in complete loss of control with resultant injury to the occupants of such vehicles and to other vehicles which may be involved in a collision. This condition is particularly serious in heavy duty vehicles and heavily loaded vehicles, such as trucks, busses, or tractor-trailer units.

In addition to personal injury losses, losses may be incurred in the lading in the case of freight-hauling vehicles. Apart from the major losses mentioned above, it is important from the economic standpoint in the operation of a trucking fleet, for example, to maintain proper tire pressure to prevent excessive tread wear. In the case of dual tire wheel units, in particular, excessive tread wear will occur on the softer of the two tires and such excessive tread wear may be aggravated by the road surface conditions or the particular load conditions of the vehicle. It is important in this respect to keep the pressures relatively equal in dual wheel units; and for this purpose vehicle operators make frequent stops to check the pressure of the tires. Unequal tire pressure may occur in a dual wheel unit not only through pressure loss through a slow leak in one tire, but also due to unequal pressure buildup due to heat as a result of the road surface or load conditions.

U.S. Pat. No. 3,717,030, issued on Feb. 20, 1973 to Clarence L. McGhee (the present inventor) and Dennis C. Enders, discloses a device for the monitoring of tire pressures on a vehicle by mounting hub units on each wheel unit. Each hub unit includes a radio transmitter. A radio receiver is positioned leading to the vehicle operator. Each hub unit includes a bellows which is responsive to tire pressure so as to operate a visual pressure gauge on the hub unit which may be observed by the operator when the vehicle is stopped. It will also serve to energize the transmitter when the pressure decreases to a preselected value. For dual wheel units used on heavy duty vehicles, a common bellows may respond to the lower pressure of the two tires to indicate the lower pressure on the gauge and to transmit the fault signal. The dual wheel unit includes two bellows for actuating separate visual gauges for the two tires. A valve means is provided on the hub unit for equalizing tire pressures.

It is an object of the present invention to provide a system for detecting pressure loss and for providing a warning or fault signal to the vehicle operator when the pressure loss occurs.

It is another object of the present invention to provide a system which can transmit a signal to a receiver controlled by the operator of the vehicle.

It is still a further object of the present invention to provide a system that assures proper inflation pressure for the tires.

It is a further object of the present invention to provide a system that effectively maintains the pressure in dual tire units.

It is a further object of the present invention to provide a system which supplies its own power through the action of the rotating wheel for the purpose of operating the transmitter and receiver and associated solenoids.

It is still a further object of the present invention to provide a system which is easy to use, easy to install, and relatively inexpensive.

These and other objects and advantages of the present invention will become apparent from a reading of the attached specification and appended claims.

SUMMARY OF THE INVENTION

The present invention is a tire pressure management system which includes a tire, a tire condition monitoring means connected to the tire so as to be interactive with air pressure in the tire, a controller having a transmitter and a receiver connected thereto, and a display connected to the controller for displaying a humanly perceivable indication of a condition of the tire. The tire conditioning monitoring means serves to selectively measure a pressure in the tire and includes a transmitter and a receiver. The transmitter of the controller serves to transmit a first radio signal to a receiver of the tire condition monitoring means. The receiver of the controller serves to receive a second radio signal as transmitted from the transmitter of the tire condition monitoring means. The present invention includes a plurality of tire condition monitoring means positioned on the wheels of the vehicle. Each of the transmitters of the tire condition monitoring means has a common carrier frequency for the second radio signal. The transmitter of the controller includes a programming transmitter for transmitting a programming signal to the tire condition monitoring means and a main transmitter for accessing each of the tire condition monitoring means. The programming transmitter is of a different frequency than the main transmitter. The receiver of the tire condition monitoring means includes a programming receiver tuned to the frequency of the programming transmitter and a main receiver tuned to the frequency of the main transmitter. The programming receiver is sensitized so as to only receive signals as transmitted from a lesser distance than the signals received by the main receiver. The controller includes accessing means connected thereto for selectively accessing one of the tire conditioning monitoring means and for displaying the condition of the tire associated with that tire condition monitoring means. The display can further include an alarm connected to the controller so as to produce an audio or visual indication when one of the tire condition monitoring means measures a tire pressure beyond a predetermined threshold value.

The tire condition monitoring means includes a pressure transducer which is connected to the tire. The pressure transducer produces an electronic signal relative to a pressure in the tire. The pressure transducer is electrically connected to the transmitter. A mounting spider is affixed to a wheel of the tire. The pressure transducer includes a chamber which is connected to a valve of the tire. The pressure transducer measures the pressure within that chamber. An air compressor is mounted to the wheel of the tire so as to deliver air to an interior of the tire when pressure in the tire is below a predetermined value. The air compressor includes a piston and a cylinder receiving the piston therein. The piston is movable within the cylinder relative to a rotation of the tire. The cylinder has an intake valve and an outlet valve. The outlet valve is connected to the tire such that pressurized air from the cylinder passes into the tire. The piston includes a shaft having a primary piston at one end and a secondary piston at an opposite end. The cylinder includes a primary cylinder that receives the primary piston and a secondary cylinder that receives the secondary piston. A pressure regulator is connected to the tire and connected to the outlet valve of the cylinder. The pressure regulator serves to control a passage of pressurized air from the cylinder to the tire. The pressure regulator has a first outlet and a check valve mounted therein. The check valve serves to pass pressurized air from the cylinder when the air pressure in the tire falls below a predetermined value. The pressure regulator further includes a vent that extends exterior of the tire so as to pass pressurized air above a predetermined value to the environment exterior of the tire. The piston is connected to a crankshaft such that the piston moves in the cylinder upon relative rotation between the cylinder and the crankshaft. A pendulum torque mechanism is connected to the crankshaft for holding the crankshaft in a stationary position as the wheel rotates.

A power generator is connected to the tire condition monitoring means so as to provide electrical energy thereto. This power generator includes an alternator magnet assembly and an alternator induction coil assembly connected to a wheel of the tire such that relative rotation occurs therebetween as the tire rotates.

DETAILED DESCRIPTION OF THE INVENTION

Figure 1:
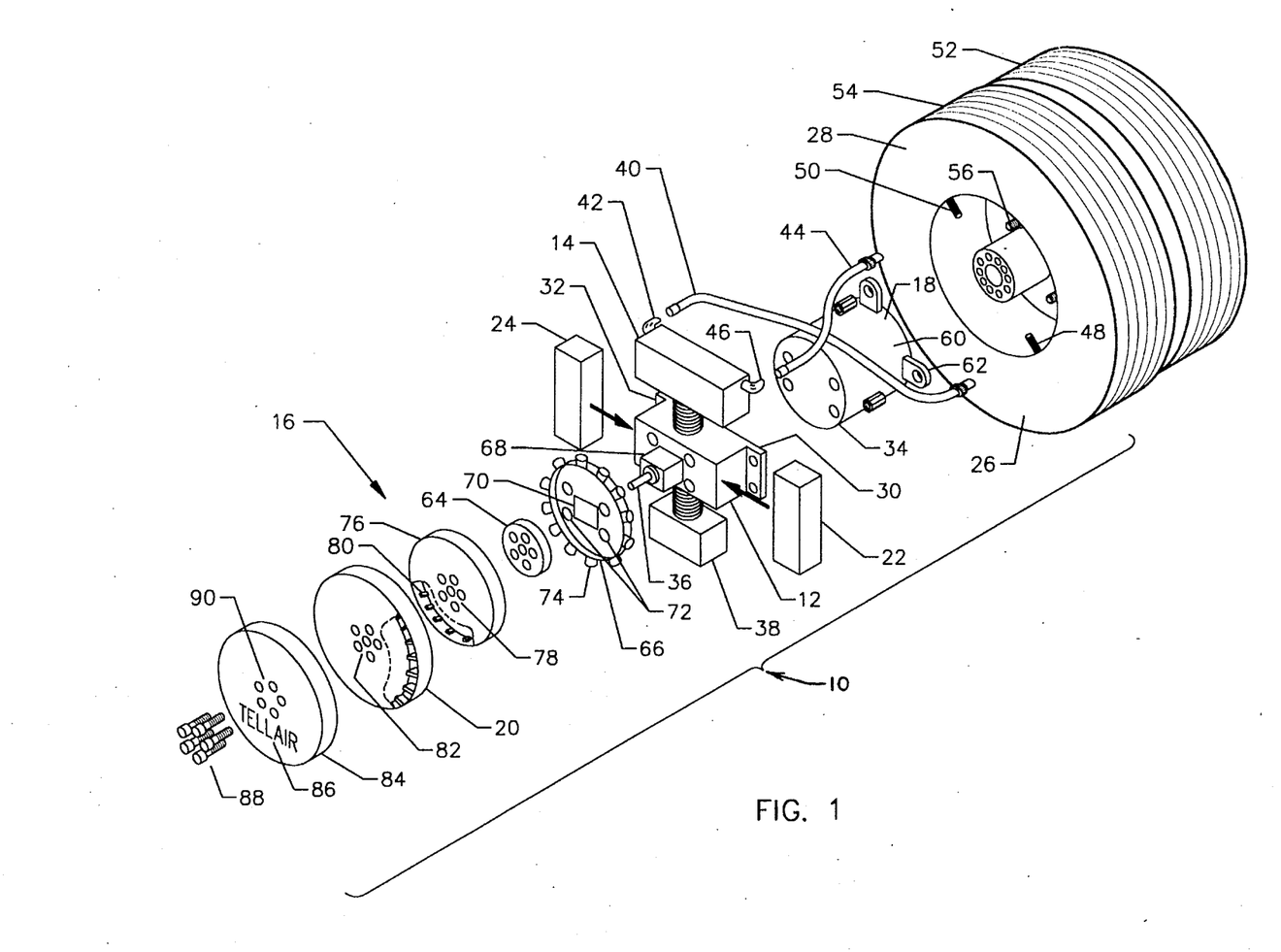
FIG. 1 is an exploded view showing the hub unit in accordance with the preferred embodiment of the present invention.

The present invention is a tire pressure management system for the control and observation of tire pressure in vehicle. The tire pressure management system of the present invention includes a master unit and a hub system. FIG. 1 shows the hub system 10 in accordance with the preferred embodiment of the present invention. The hub system 10 includes an air compressor 12, a pressure regulator 14, an alternator 16, a mounting spider 18, a pendulum torque unit 20, a battery pack 22, and an electronics package 24.

In the development of these components of the present invention, a number of goals and constraints were considered in the design of the various components. First, the overall size of the package is constrained by the need to keep the area around the wheel 26 of tire 28 lug bolt-free for highway control and inspection. Secondly, the unit 10 must be very rugged in order to withstand the vibrations and centrifugal forces involved, as well as both high and low temperatures and wet conditions. The system 10 must be friendly to the user, must be easy for the driver to program and use and easy for the tire maintenance people to work around. The hub unit 10 must be able to sit idle for long periods of time without reprogramming. The hub unit 10 must not unbalance the wheel 26 and tire 28. The hub unit 10 must not interfere with the lug attachment system of the existing lug bolts. The system 10 should not extend out to the outer surface of the wheel 26 such that curbs could damage the unit if the vehicle is parked close to a curb. The system should be as fail safe as possible for the maximum pressure that can be attained. The system 10 must be compatible with truck stops where many trucks may be located in the same vicinity.

Initially, it can be seen that the hub unit 10 includes a two stage compressor 12 that includes mounting brackets 30 and 32 for attachment to corresponding holes formed on a face 34 of the mounting spider 18. The compressor unit 12 has a compressor shaft 36 extending outwardly therefrom. The battery pack 22 is affixed to one side of the compressor unit 12. The electronics package 24 is attached to the other side of the compressor unit 12. An air filter 38 is connected to the compressor 12. Similarly, the pressure regulator 14 is connected to the compressor unit 12 at an opposite side from the air filter 38. The combined package should be of a sufficient size so as to fit within the area defined by the wheel 26. In FIG. 1, it can be seen that a flexible hose 40 has one end suitable for connection to an outlet 42 of the pressure regulator 14. Similarly, a second hose 44 has an end which is suitable for connection to an outlet 46 of the pressure regulator 14. The first hose 40 extends for a length so as to connect with a tire filler stem 48 associated with tire 28. Additionally, the second hose 44 can be connected to the filler stem 50 associated with tire 28. As used herein, tire 28 refers to an inner tire 52 and an outer tire 54. Under the normal circumstances of installation, the filler stem 50 of the inner tire 52 will extend outwardly so as to be accessible on the surface of the wheel 26. It can be seen that the wheel 26 includes three special extended lug nuts 56 which extend through the holes formed in the wheel 26. These special extended lug nuts are suitable for receiving the mounting spider 18, along with the equipment attached to the face 34 of the spider 18.

The mounting spider 18 includes a tube 60 which fits over the driver axle hub assembly of wheel 26. The diameter of the axle hub is approximately 8.5 inches. In order to ensure that the spider 18 will fit over a slightly oversize axle, the inside diameter of the spider tube 60 is nine inches. Three lugs or ears 62 are welded to the outside of the tube 60 so as to radiate outward in a pattern consistent with the bolts 56 of the wheel 26. Each lug 62 has a hole which is chamfered at forty-five degrees so as to accept the taper of a standard lug-bolt system for truck/bus tires. The inside tire 52 is secured with stud-bolts which screw onto hub bolts. The stud-bolts which screw onto hub bolts. The stud-bolts are available in several lengths. The outside tire 54 is secured by several nuts which screw onto the stud bolts with a left hand thread. The stud bolts 56 are used so as to secure the inside tire 52 so as to leave room for an additional nut to be used after the outer tire 54 is secured. The three ears 62 are welded to the mounting spider tube 60 with a forty-five degree chamfer. This provides for accurate centering of the spider tube assembly 18 so as to maintain the balance of the entire assembly. The axle housing, with its axle bolts, extends outwardly from the surface of the outer wheel mounting surface. The top surface 34 is welded to the tube 60 with a hole pattern consistent with the compressor mounting holes 30 and 32, the battery pack 22, and the electronics package 24 mounting holes. As a result, centrifugal force is minimal on the parts because most of the package is mounted near the center of rotation of the wheel assembly.

The case for compressor 12 is mounted onto the surface 34 of the spider mounting plate using bolts that are inserted from the inside of the spider tube 60 and screwed into tapped threads on the compressor base. The main shaft bearings are located so that virtually all of the side load is applied directly from the hub to the outboard bearing and not to the shaft itself. The bearings 64 are sealed ball bearings in order to keep dirt and water out of the compressor. In the present invention, it can be seen that alternator induction coil 66 is positioned around the bearing case 88 of the compressor 12. Specifically, the rectangular inner diameter 70 of the alternator induction coil 66 is received on the case 68. Holes 72 are provided adjacent to the interior opening 70 so as to be fixedly secured to assembly bolts extending through the system. As such, the alternator induction coils will be fixed to the compressor 12 such that, as the compressor 12 rotates, the alternator induction coil 66 will rotate in correspondence thereto. A total of twelve induction coils 74 extend around the circumference of the coil assembly 66.

The compressor front bearing mount 64 includes an interior hole that mounts on the compressor shaft 36 of the compressor 12. The alternator magnet assembly 76 is secured to the compressor front bearing mount 64 through holes 78 formed on the interior of the alternator magnet assembly. The alternator magnets 80 are positioned around the interior circumference of the assembly 76. The compressor shaft 36 will extend through the central opening on the interior of the assembly 76. In normal use, the alternator magnet assembly 76 will remain stationary as the alternator induction coil assembly 66 rotates with the rotation of the compressor 12. The interaction between the magnets and the induction coils acts as an alternator so as to provide energy to the system of the present invention.

Figure 2:
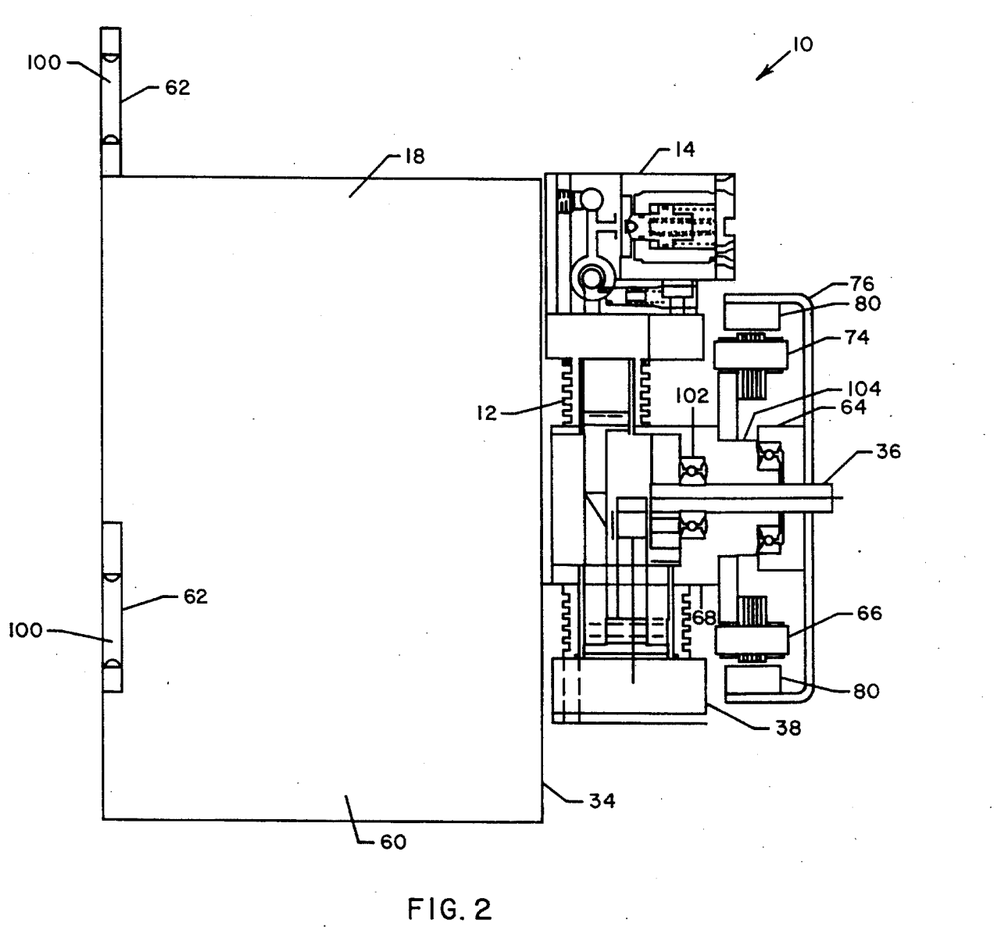
FIG. 2 is a cross-sectional side view of the hub unit of the present invention.

A pendulum drive unit 20 includes interior openings 82 that are secured to the holes 78 on the alternator magnet assembly 76 and to the holes associated with the compressor front bearing mount 64. Similarly, the compressor shaft 36 will extend through the central opening of the pendulum drive unit 20. The pendulum drive unit 20 provides torque to the compressor and alternator as their bodies rotate with the rolling of the tires. The pendulum drive unit 20 will hang stationary. The pendulum drive unit 20 provides a hanging weight which produces most of the operating torque. A turbine, which uses lead shot or other heavy granulated material as the operating fluid, is combined with the hanging weight in order to ensure that the pendulum 20 would self-recover if it ever rolled over the top of the motion. In this case, the work done lifting the lead shot versus the lack of work done in letting the shot fall to the bottom, produces a net energy input which guarantees recovery. An additional benefit of using a fixed weight is that the heavy side of the turbine will always hang down such that a wheel cover 84 can be attached with a company logo 86 painted on the outside surface. In this case, the logo 86 will always remain right side up. Assembly bolts 88 extend through the holes 90 on the wheel cover 86, through the openings 82, into the holes 78, and into the holes of the compressor front bearing mount so as to secure the assembly together. FIG. 2 shows the assembled configuration of the components (absent the pendulum drive unit 20 and the dust cover 84).

In FIG. 2, it can be seen that the mounting spider 18 has the spider tube 60 extending outwardly from the lugs 62. The lugs 62 have an interior opening 100 which allows the lugs 62 to be fastened to the extended lug nuts of the wheel 26. The interior of the spider tube 60 will fit over the outwardly extending drive axle hub assembly of the wheel 26. In FIG. 2, it can be seen that the compressor 12 is mounted directly to the outside surface 34 of the mounting spider 18. The air filter 38 is positioned at the bottom of the compressor 12. Similarly, the pressure regulator 14 is positioned at the top of the compressor 12. Of course, the orientations of "top" and "bottom" are relative to the rotational movement of the wheel to which the unit 10 is attached. The compressor 12 includes an outwardly extending compressor shaft 36. The shaft 36 is supported on bearings 102 on the interior of the bearing housing 68. The bearing housing 68 enclosed the interior of the compressor and its bearing area.

The alternator induction coil assembly 66 is fixedly positioned onto the outer surface 104 of the housing 64. The coils 74 extend around the outer circumference of the alternator induction coil assembly 66.

The compressor front bearing mount 64 extends over the compressor shaft 36 and is in rotatable relationship to the housing 68. The alternator magnet assembly 76 extends over the shaft 36 such that the magnets 80 can rotate in proximity to the outer surface of the inductions coils 74 of the alternator induction coil assembly 66. Since the alternator magnet assembly 76 is connected to the compressor front bearing mount 64, and to the pendulum drive unit 20, the alternator magnet assembly 76 will remain relatively stationary as the wheel of the vehicle rotates as it travels along a surface. As such, the induction coils 74 will rotate in relation to the stationary magnets.

Figure 3:
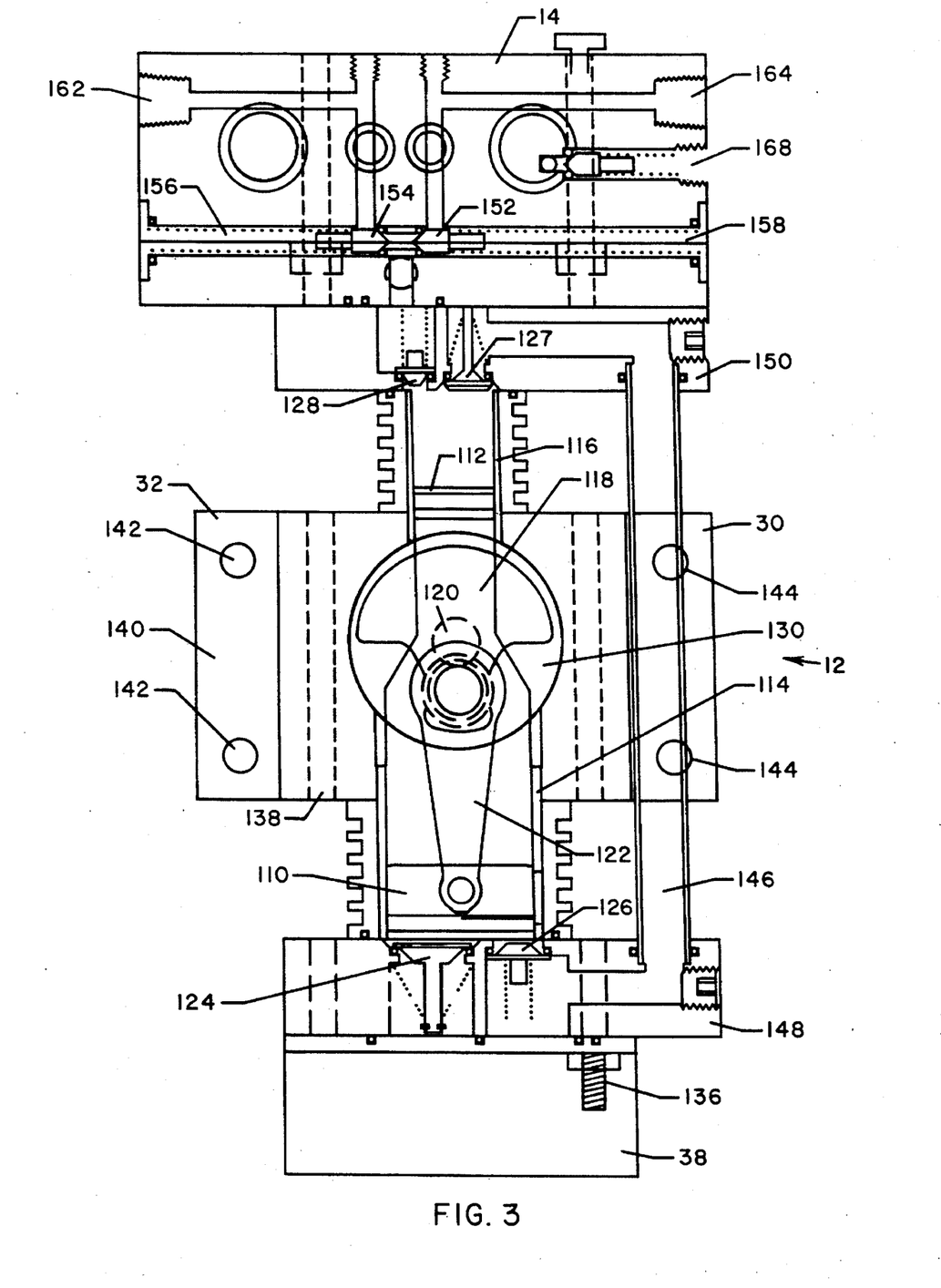
FIG. 3 is a cross-sectional side elevational view of the air compressor and pressure and regulator in accordance with the preferred embodiment of the present invention.

FIG. 3 illustrates the interior of the compressor 12. The compressor 12 includes a primary piston 110 and a secondary piston 112. The primary piston 110 is received within a primary cylinder 114. The secondary piston 112 is received within a secondary cylinder 116. A shaft 118 connects the piston 110 to the piston 112. A crankshaft 120 is provided for the operation of the two stage piston-and-cylinder assembly associated with the compressor 12. A connecting rod 122 extends from the crankshaft 120 to the piston 110 so as to cause the necessary movement of the pistons within their associated cylinders.

The primary cylinder 114 includes an intake valve 124 and an outlet valve 126. Similarly, the secondary cylinder 116 includes an intake valve 127 and an outlet valve 128. These valves are positioned in their respective ends of the cylinders 114 and 116.

In the present invention, tire pressures of at least 100 p.s.i. are anticipated. In order to deliver a sufficient volume of compressed air, the two stage pump of the present invention was designed. It can be seen that if a single stage pump is used which is capable of producing 120 p.s.i. maximum, the resulting volume at 105 p.s.i. is about 10% of its capability at 0 p.s.i. Adding a second stage should, at least, double the output of the compressor 12 and also provide the additional benefit of reducing the peak torque required. The present invention provides two torque pulses per revolution.

In order to deliver the maximum volume, it is important not to restrict the flow at the input. As such, the intake valves 124 and 127 are thus the absolute maximum diameter possible consistent with maintaining a high compression ratio. These valves are located such that their outer dimensions are slightly outside the envelope of the cylinder bores in order to maximize the diameter of the valves. The valve springs both center the valve and help to provide a seal when the compressor is between strokes.

The piston assemblies 110 and 112 include a one piece piston with TEFLON (TM) rings. The diameter of the primary piston 110 for the low pressure inlet stage is 1.125 inches. The diameter of the piston 112 for the second stage is 0.625 inches. A straight edge can be laid against the inside back surface of both cylinder walls, and correspondingly, the back surface of the piston assembly lies in a straight line. A single connecting rod 122 is used in order to allow a long stroke to bore ratio for the smaller cylinder 116. With the single piston arrangement, there is no cocking moment and therefore the piston does not require skirts. Since only the piston rings contact the cylinders and the piston may be considerably smaller than the cylinder diameter, reduced friction occurs. Also, small rotational misalignments of the piston can be tolerated without the piston jamming in the bores of the cylinders.

The compressor 12 is assembled by first installing the crankshaft assembly 120 with its bell crank/counterweight 130 pressed onto the end of the crankshaft 120. The rod journal is removed at this time. The piston and connecting rod assembly is then inserted through the large cylinder bore 114. Lastly, the rod journal is then screwed through the connecting rod 122 and into the crankshaft counterweight assembly 130 and securely tightened.

The intake air for the compressor 12 is drawn from the interior of the mounting spider 18. A tube 132 connects through a grommet to an air filter 38. The air filter 38 is then connected to the inlet port 124 of the compressor 12. The purpose for locating the inlet at this point is to minimize the probability that water can be drawn into the compressor 12. It can be seen that long steel bolts 136 extend from the pressure regulator 14 to the air filter 38. These long reach bolts 136 serve to secure the pressure regulator 14 to the compressor 12 and also serve to secure the air filter 38 to the compressor 12. Another bolt passageway 138 is provided on the opposite side of the compressor 12.

A crankcase and mounting base 140 is provided having flanges 30 and 32 mounted thereon. Holes 142 of the flange 32 and holes 144 of the flange 30 are used to secure the compressor 12 to the surface 34 of the mounting spider 18.

In FIG. 3, it can be seen that the outlet valve 126 includes a passageway 146 that extends for the length of the compressor and opens to the intake valve 127 associated with the secondary piston 12. The intake valve 124 and the outlet valve 126 are supported on a primary cylinder head 148. The intake valve 127 and the outlet valve 128 are supported on a secondary cylinder head 150.

The pressure regulator 14 is connected so as to communicate with the outlet valve 128 associated with the secondary cylinder 116 and the secondary piston 112. The pressure regulator 14 includes check valves 152 and 154 associated with the exit of the outlet valve 128. Pressure sensors 156 and 158 extend into the regulator body 14 so as to measure the pressure within the interior chamber of the regulator 14. Another check valve 160 is provided so as to vent air to the outside. A first outlet 162 is interconnected to one of the filler stems associated with one of the tires. Another outlet 164 is connected to the other filler stem of the tires to which the compressor is attached. As such, the interaction of the pressure sensors 156 and 158, the check valves 152, 154, and 160, along with the outlets 162 and 164, serve to properly control the pressure within the tires of the vehicle. The operation of the pressure regulator 14 is more easily understood with reference to the schematic diagram of FIG. 4.

Figure 4:
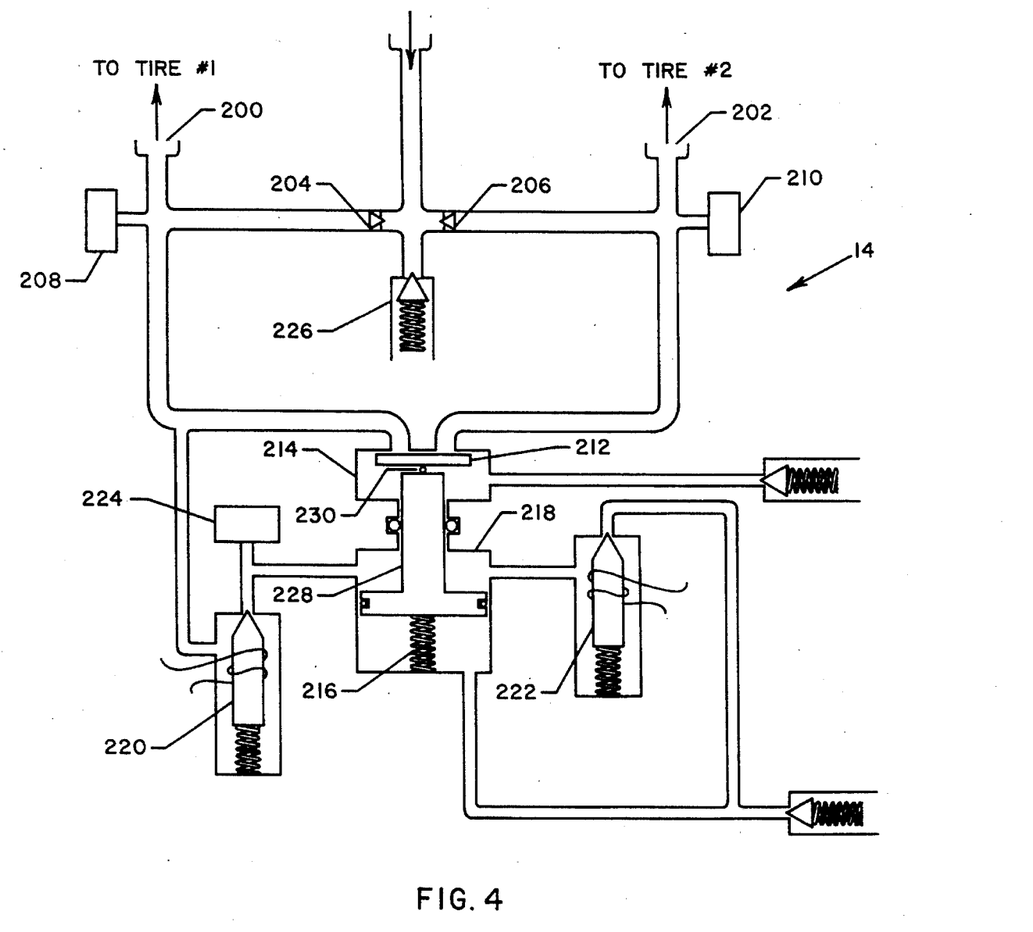
FIG. 4 is a schematic diagram of the operation of the pressure regulator of the present invention.

The pressure regulator 14 serves to bleed off air when the pressure exceeds the preset value. Since the air compressor 12 is operating continuously, its output must be bled off when the tire pressures are already at the desired pressure. Each tire is individually connected to the regulator 14 by a short flexible hose from the tire's valve stem. When the inside and outside wheels are installed on the axle hub, the valve stems are 180 degrees opposite each other. When the spider 18 is installed, it is oriented so that the short hoses spiral around the spider 18 approximately 180 degrees on the route to the individual valve stems. The hoses are thus supported, without the need for clamps, against the forces of vibration and centrifugal force.

The individual tire ports 200 and 202 are connected by passageways to three distinct devices: check valves 204 and 206, pressure transducers 208 and 210, and an O-ring seal 212 for each tire upon which a common plate or disk 214 is pressed by springs. The individual check valves 204 and 206 allow flow from the compressor to the output cavity. The pressure is measured at each of the cavities for both reporting a loss of tire pressure and also for communicating to the regulator circuitry the need for adjusting the spring pressure to the regulator plate 214.

Force is applied to the regulator plate 214 by the action of springs 216 and also by air pressure in the regulator cavity 218. Two small solenoids 220 and 222 modulate the pressure in the regulator cavity 218 by either bleeding pressure to the atmosphere to reduce the cavity pressure or by allowing pressure from one of the tires to increase the pressure in the cavity 218. The solenoid coils 220 and 222, being small, require very low electrical power to operate. They are only powered when a change of pressure is desired. A third pressure transducer 224 monitors the pressure in the regulator cavity 218 for positive control of the regulator operation.

Maximum pressure available is limited by a pressure relief valve 226 at the output of the compressor. This relief valve 226 is set to "pop off" at the highest safe operating pressure of the tires. This ensures that the tires can never be inflated above their maximum safe pressure if a failure occurs in the regulator system. Alternatively, the regulator springs are chosen strong enough so that zero pressure in the regulator cavity 218 causes the individual valves to "pop off" at the maximum safe tire operating pressure. The pressure set point is reduced by allowing pressure from one of the tires to push on a piston which counteracts the force of the springs so as to reduce the closing force of the regulator plate 214. The cross-sectional area of the ledge on the piston is determined by the ratio of the diameters of the upper and lower portions of the piston and is chosen such that the full pressure of the tire cannot overcome the force of the springs if the tire pressure falls below the minimum desired pressure. This arrangement produces a fail-safe regulator which neither allows overinflation nor a flat tire in the event of failure of the control system.

Since the solenoids operate on very low power in order to conserve on battery life, light springs must be used. It is expected that the resident frequency of the springs and the mass of the solenoid slugs will reside within the spectrum of road vibrations. Therefore, the solenoids are positioned in the same plane as the wheel axis so that centrifugal force or vibration from running over bumps does not modulate the force on the solenoid slugs.

The regulator piston 228 presses on the regulator plate 214 through the use of a ball bearing 230. This serves to increase the precision of balancing the two tire pressures. If it is desired to run the inside tire at a slightly lower pressure than the outside tire, the ball bearing pockets can be made slightly off center or one O-ring seal can be made slightly larger than the other to vary the cross-sectional area of one with respect to the other.

Figure 5:
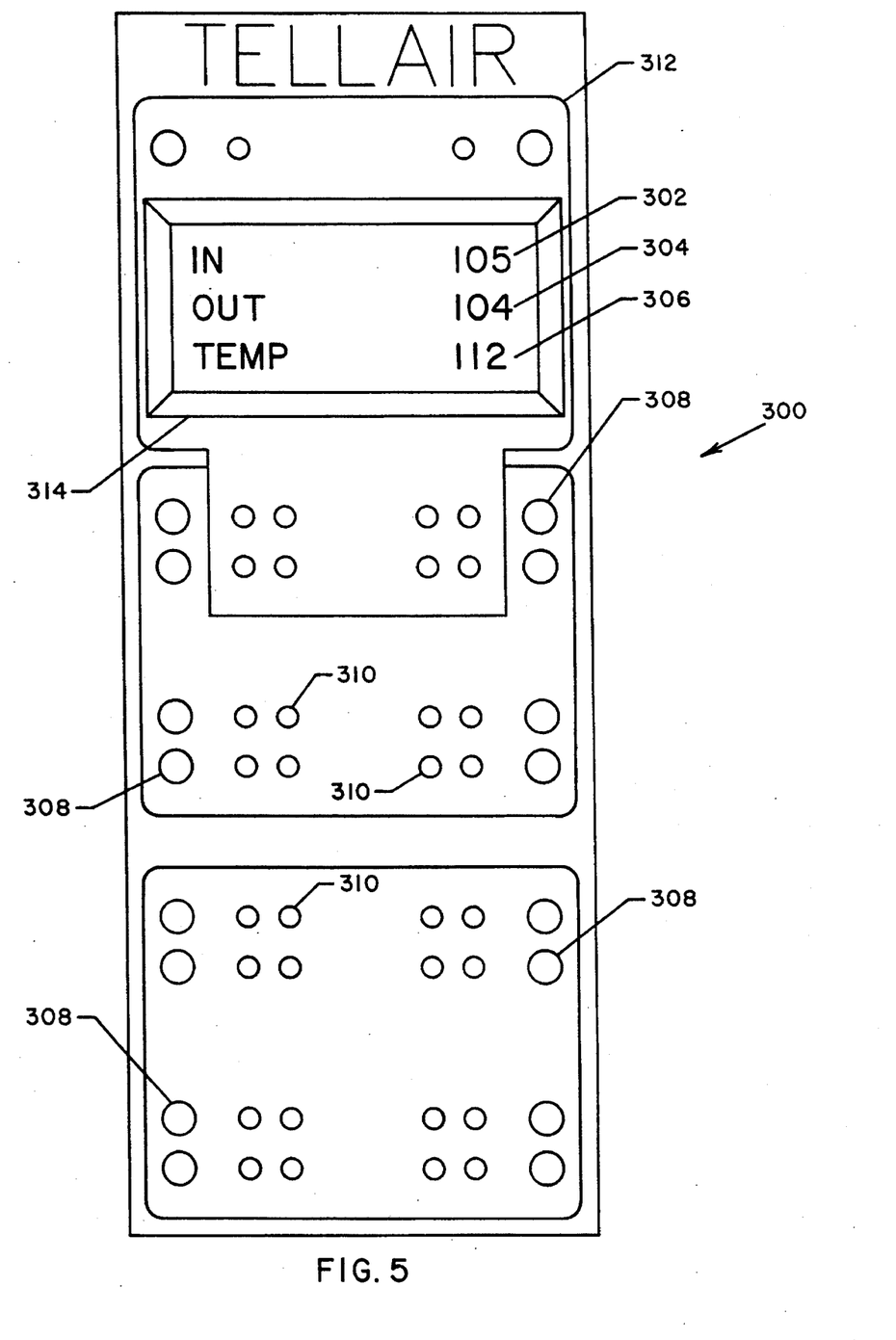
FIG. 5 is a view of the driver's display and control unit associated with the master controller of the present invention.

FIG. 5 illustrates the control unit 300 in accordance with the teachings of the present invention. The control unit 300 can be located within the cab of the vehicle so as to provide the operator of the vehicle with proper information concerning the status of the various wheels of the vehicle. As it can be seen, the master control unit 300 includes inside tire pressure reading 302, outside tire pressure reading 304, and temperature reading 306. These readings are provided by the electronics package 24 of the present invention. It can be seen that a plurality of buttons 308 extend around and along the periphery of the master controller 300. The buttons 308 correspond to sets of tires located on the truck. L.E.D.'s 310 are shown in an arrangement modeling the arrangement of tires on the vehicle. It can be seen that the front tires are shown at 312 above the display 314. The rear tires of the vehicle are shown in their distributed pairs corresponding, generally, to the location of such tires on the vehicle. The master controller 300 is illustrated as being able to accommodate up to twenty-six wheels. This arrangement can occur when a double trailer, with double duals, front and rear, is operated. The pressure readings 302 and 304 are displayed corresponding with the accessing of a particular button 308. The pressures 302 and 304 are shown in a digital readout. Similarly, the temperature display 306 can be accessed by pressing a particular button 308 corresponding with a particular set of tires.

Figure 6:
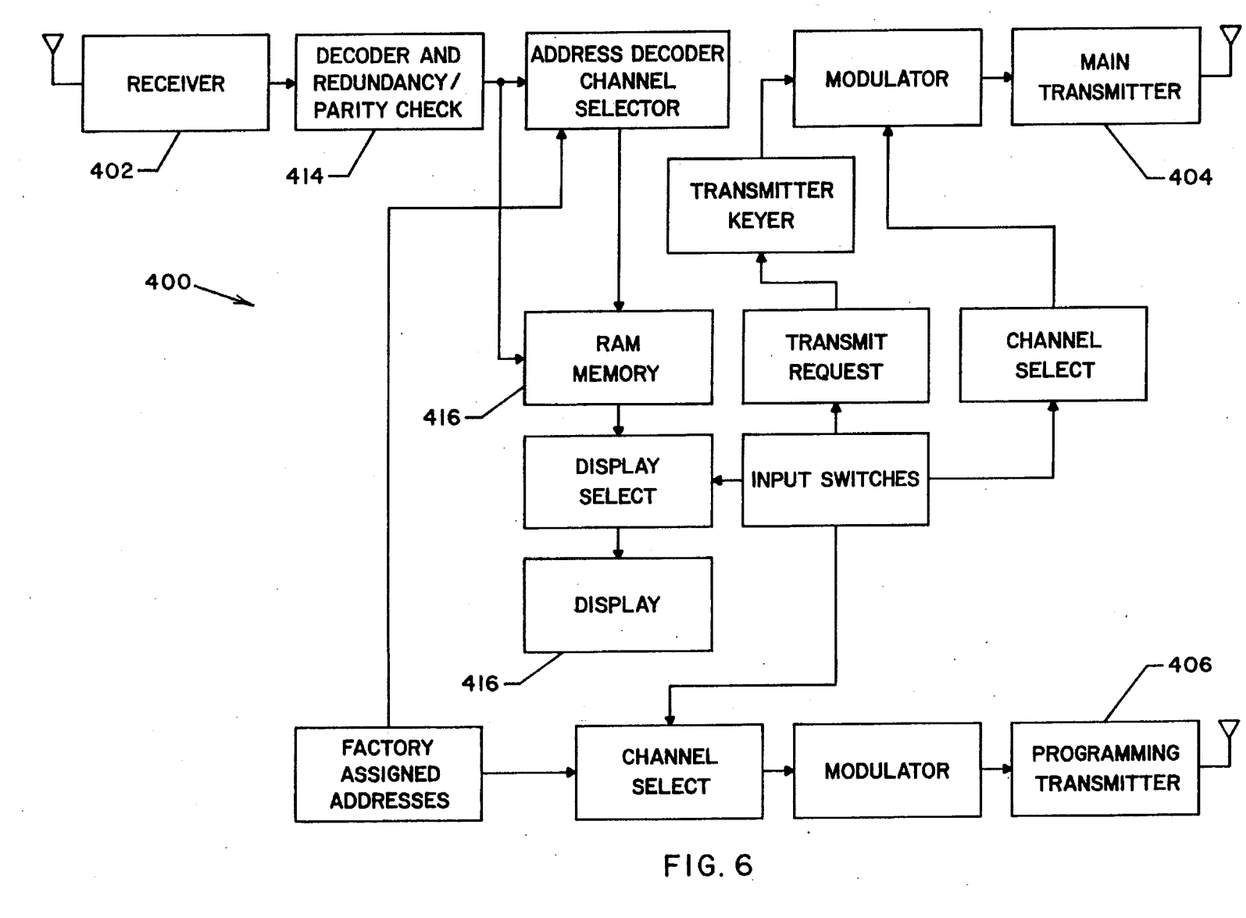
FIG. 6 is a block diagram of the display and master control unit.
Figure 7:
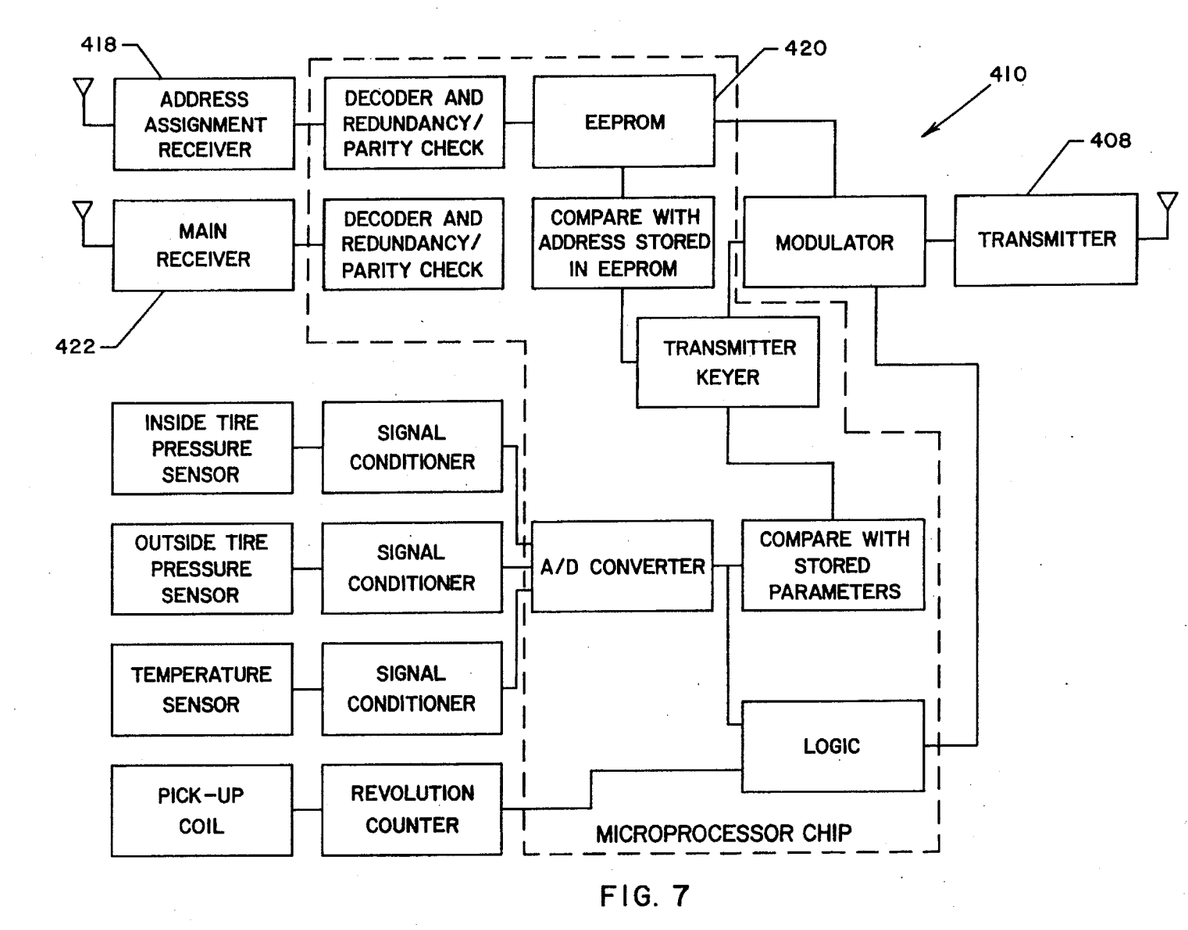
FIG. 7 is a block diagram of the remote hub unit of the present invention.

Referring to FIGS. 6 and 7, there are shown block diagrams of the electronics of the system of the present invention. In FIG. 6, the block diagram of the display and master control unit of the present invention is shown. The master unit 400 includes one receiver 402 and two transmitters 404 and 406. The control logic for the master unit 400 is implemented mostly within a microprocessor. The receiver 402 is tuned to the frequency of the main transmitter 408 of the hub unit 410 (shown in FIG. 7) and provides an output when any hub unit 410 is actively transmitting. Since all of the hubs transmit on the same frequency, the master receiver 402 will output signals for processing when any hub is transmitting. The transmitted signal from each hub unit 410 includes its stored address along with its data.

The output from the receiver 402 is a serial bit stream of data which is converted to a word in the decoder unit 414. This unit also makes a parity checksum test in order to ensure the validity of the data. The decoded output is compared with the factory assigned addresses programmed into the master unit 400. If the received address compares with one of the stored addresses, the data storage for that address is updated and the display 416 will indicate the latest data.

If an update is desired for any individual hub unit, the input switch 308 for that hub is pressed and held for two seconds. This initiates the transmission of a request by the main transmitter 404. The address for that hub is sent and received by the hub units 410. The hub unit whose stored address matches the main transmitter's output then responds by transmitting pressure and temperature data along with its address and checksum data. If the received data passes the tests for validity, the pressure and temperature data is stored in the memory 416 for that hub. If the data does not pass the validity checks, a retransmission is automatically requested from the master unit 400 by transmitting an update message to the hubs. After five unsuccessful attempts to get a good update from the hub unit, an alarm is indicated by flashing lights for that hub unit on the display 300.

When an update from all of the hub units is desired, the buttons corresponding to both front wheels are pressed simultaneously and held for two seconds. An automatic sequence is thus initiated in which each hub is interrogated in turn and the returned data is checked for validity. The five attempt procedure is automatically exercised, and unsuccessful communication is indicated by flashing lights.

At the time of manufacture, all hub units have no address assignment, but rather a portion of non-volatile memory which can be programmed to store an address assignment. In order to program a hub unit or units, the master unit 400 is unplugged from its mounting socket in the cab of the truck and is carried by the operator to the immediate vicinity of the hub. The operator then presses the button corresponding to the position on the truck for that hub and holds the button pressed until a green "okay" indication lights for that hub.

After the button has been held for five seconds, the programming sequence is initiated. The programming transmitter 406 in the master unit 400 is activated and the address assignment for that hub is transmitted. The programming receiver 418 in the hub unit 410 receives this address which is stored in EEPROM memory 420 in the hub unit. The hub unit then transmits its stored address back to the master unit 400 through the normal hub transmitter 408. The master unit receives this returned address and checks it with its original assignment. If the correct return is noted, a green "okay" LED is lighted.

The main transmitter 404 in the master unit and the main receiver 422 in the hub unit operate on the same carrier frequency. The programming transmitter 406 in the master unit and the corresponding receiver 418 in the hub unit 410 operate on a second carrier frequency. The second carrier frequency is different than the first carrier frequency. The programming receiver 418 in the hub unit 410 is desensitized so that only signals originating very close to the hub will be received. This ensures that the address assignment for the hub unit cannot be changed accidentally by the transmission from another truck or the programming signal when another hub on the same truck is activated.

The operation of the master unit 400 and the hub unit 410 operate in the following manner. In normal operation, the master unit 400 receives unless an individual hub request is made by the operator. When the button 308 is held for two seconds or longer, a transmission to that hub is requested. The display storage for both inside and outside tire pressures, the axle temperature, and the mileage counter is updated for that hub. The hub units 410 are receiving only unless an out-of-tolerance measurement is made. The hub unit 410 then transmits its address, along with the complete set of measurements, from that hub. The master unit 400 periodically interrogates the entire set of hub units, approximately once per hour, and stores the latest set of data. The driver may momentarily push the button 308 adjacent to the readout of the desired hub for the last stored data.

The master unit 400 transmits, sequencing through all of the hub addresses, and stores the received data for display 416. This update is initiated by pressing both of the front wheel interrogate buttons 312 simultaneously.

In order to program the hub units 410, the master unit 400 is unplugged from its receptacle in the cab of the truck. The unit will continue to operate on its internal battery. The operator will hold the master unit 400 near each hub unit and press and hold the button adjacent to the display for that hub. The master unit 400 will output an address for that hub with a low power signal on a programming frequency. The hub unit 410 receives and stores the address as its own individual address. This will be the address that the hub sends along with its data each time that it transmits. While the button for that hub is being pressed and held on the master unit 400, several operations occur automatically. First, the master unit 400 initially transmits on a programming frequency. Secondly, the address data for the hub unit selected is transmitted on this programming master frequency. The master unit 400 confirms that the hub has correctly repeated the address. Finally, the master stores the data from the hub and sounds an audible signal, such as a beep.

The present invention may also include a mileage update mode. A mileage register can be incremented as the wheel turns and can be used in place of the hubometer often used on trailer wheels. In order to display the mileage for a given hub, the request button for that hub is pressed three times within two seconds. This action causes the master unit to display the data taken during the last update from the hub. The mileage can also read at a warehouse or loading center by holding a special mileage reader unit near a given hub. This procedure is similar to the procedure for programming the address into the hub unit. In this case, however, the hub recognizes the special address for reading the mileage and simply outputs the mileage data without reprogramming its address register.

Truck tire inflation pressure, especially when dual wheel tires are involved, is a very important parameter for the safe operation of trucks and buses. Constant monitoring of the inflation pressure of each tire and telemetering the status of the tires while the truck is moving will directly reduce the possibility of tire fires and/or loss of control. Since the pressure of the tires changes with temperature, and, of course, would decrease if there is a leak in the tire, there is also a benefit to providing "inflation on the go".

The system of the present invention provides such monitoring by providing a readout in the cab or the truck or bus. The present invention includes a compressor which will continuously provide a re-inflation capability. Air can thus be added to a cold tire, correcting for its low pressure. As the tire temperature increases, the corresponding increase in pressure can be prevented by bleeding off the excess pressure. A slow leak which might occur if the tire picks up a nail, can be overcome with this re-inflation compressor, thus holding the pressure constant. If the leak exceeds the capability of the compressor, the tire pressure will decrease and this decrease will immediately be reported to the driver.

The foregoing disclosure and description of the invention is illustrative and explanatory thereof. Various changes in the details of the illustrated configuration may be made within the scope of the appended claims without departing from the true spirit of the invention. The present invention should only be limited by the following claims and their legal equivalents.

I claim:

1. A tire pressure management system comprising:

a tire;

a tire condition monitoring means connected to said tire so as to be interactive with air pressure in said tire, said tire condition monitoring means for selectively measuring a pressure in said tire, said tire condition monitoring means comprising a transmitter and a receiver;

a controller having a transmission means and a reception means connected thereto, said transmission means for transmitting a first radio signal to said receiver of said tire condition monitoring means, said reception means for receiving a second radio signal from said transmitter of said tire condition monitoring means;

a display means connected to said controller for displaying a humanly perceivable indication of the pressure of said tire; and an air compressor means mounted to a wheel of said tire, said air compressor means for delivering air to an interior of said tire when said pressure is below a predetermined value, said air compressor means for delivering air as said tire is rotating, said air compressor means comprising:

a piston;

a cylinder receiving said piston therein, said piston movable within said cylinder relative to a rotation of said tire, said cylinder having an intake valve and an outlet valve, said outlet valve connected to said tire such that pressurized air from said cylinder passes into said tire, said piston connected to a crankshaft such that said piston moves in said cylinder upon relative rotation between said cylinder and said crankshaft; and a pendulum torque means connected to said crankshaft, said pendulum torque means for maintaining said crankshaft in a relatively stationary position as said tire rotates.

* * * * *